United States Patent [19]

Antoine et al.

[11] Patent Number: 4,614,447
[45] Date of Patent: Sep. 30, 1986

[54] ROTARY MACHINE, IN PARTICULAR A CENTRIFUGE HAVING A MEANS FOR PROTECTING THE ROLLING BEARINGS

[75] Inventors: Claude Antoine, Dampierre; Bruno Zuckmeyer, Marly Le Roi, both of France

[73] Assignee: Guinard Centrifugation, Saint-Cloud, France

[21] Appl. No.: 623,241

[22] Filed: Jun. 21, 1984
(Under 37 CFR 1.47)

[30] Foreign Application Priority Data

Jul. 5, 1983 [FR] France .................................. 83 11160

[51] Int. Cl.[4] .................. B04B 9/08; F16C 27/00; F16C 35/08
[52] U.S. Cl. .................................. 384/616; 384/448; 384/590; 494/83
[58] Field of Search ............... 384/265, 490, 499, 500, 384/556, 101, 102, 613, 616, 619, 620, 448; 308/1 A; 494/83, 82, 84

[56] References Cited

U.S. PATENT DOCUMENTS

| | | | |
|---|---|---|---|
| 2,166,060 | 7/1939 | Kirk | 70/389 |
| 2,240,141 | 4/1941 | Lindgren | 494/83 X |
| 4,139,243 | 2/1979 | Landsman | 308/1 A X |
| 4,333,692 | 6/1982 | Kraus | 384/556 X |
| 4,412,707 | 11/1983 | Buffet | 494/83 X |
| 4,480,881 | 11/1984 | Fujimori | 384/613 X |

FOREIGN PATENT DOCUMENTS

| | | | |
|---|---|---|---|
| 685865 | 5/1964 | Canada | 384/101 |
| 464385 | 8/1928 | Fed. Rep. of Germany | |
| 1947043 | 3/1971 | Fed. Rep. of Germany | |
| 1141904 | 9/1957 | France | |

Primary Examiner—Stuart S. Levy
Assistant Examiner—Lynn M. Sohacki
Attorney, Agent, or Firm—Parkhurst & Oliff

[57] ABSTRACT

A rotary machine carried on a vehicle has a rotary part carried on a fixed part by means of a rolling bearing. The parts of the bearing can be separated by a lifting jack when the vehicle is travelling to reduce vibration and wear. Devices responsive to the pressure supplied to the jack stop the motor driving the rotary part when a first threshold pressure is exceeded, prevent ignition of the vehicle engine until a second threshold pressure is exceeded, and control the pump feeding the jack to maintain a third threshold value which is above the second threshold pressure.

5 Claims, 1 Drawing Figure

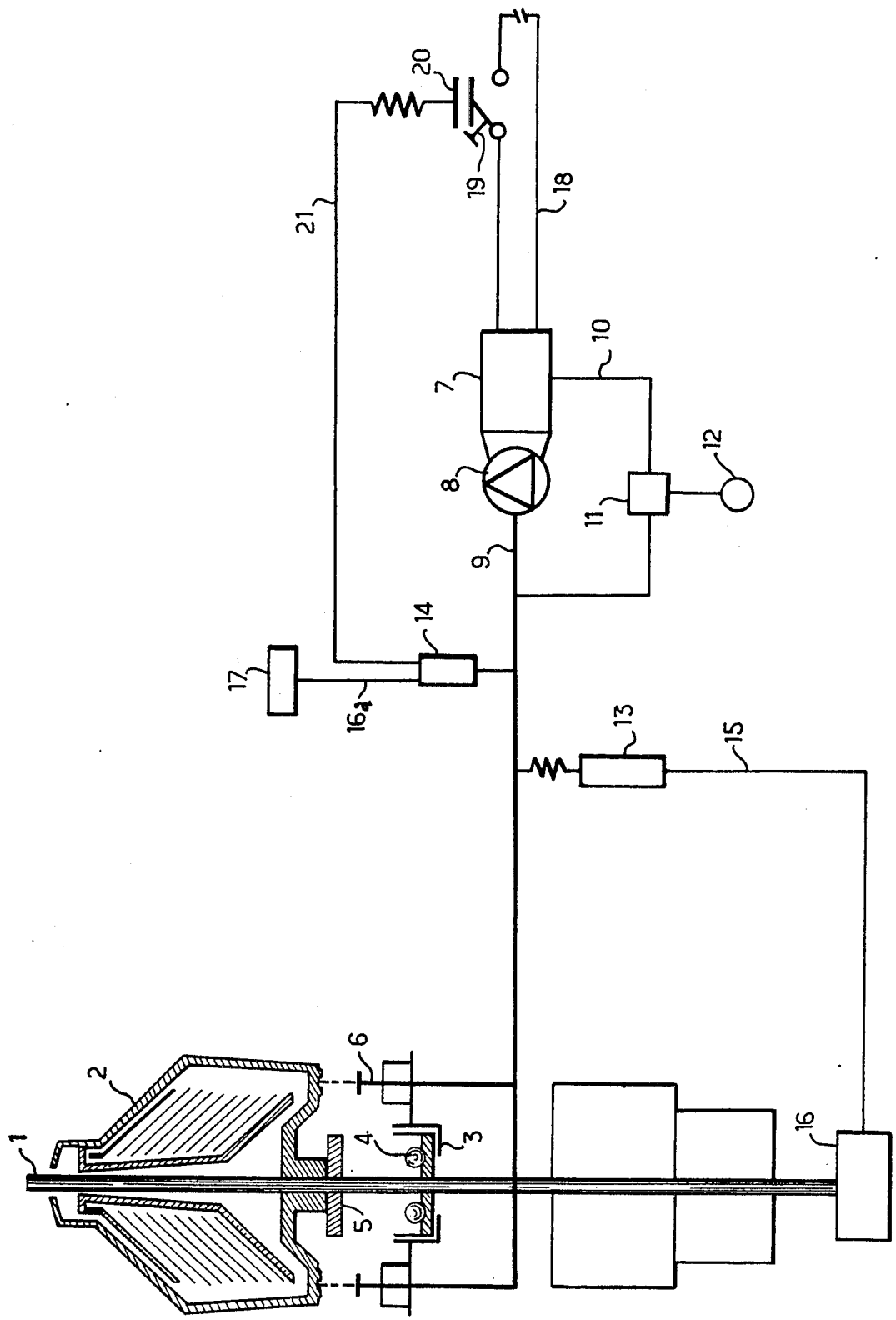

ROTARY MACHINE, IN PARTICULAR A CENTRIFUGE HAVING A MEANS FOR PROTECTING THE ROLLING BEARINGS

BACKGROUND OF THE INVENTION

The present invention relates to rotary machines comprising a portion mounted rotatably on a fixed portion by a rolling bearing assembly having members of revolution, in particular balls or rollers. The members of revolution are mounted on one of the portions and roll on a track mounted on the other portion.

Many machines of that type, in particular centrifuges, are known, which are mounted on a motor vehicle so that they can be used at different locations. The hammering effects caused by impacts and vibration during transportation cause damage to the rolling bearing tracks.

To remedy that disadvantage, it is possible to provide a jack for moving the members of revolution away from the track. During transportation or even when the vehicle is stopped, when the machine is not required to operate, the balls or rollers are moved away from their rolling bearing track so that the track does not suffer from damage. When the machine has arrived at the location at which it is required to operate, the members of revolution are brought back into contact with their track so that the fixed portion of the machine again supports the rotary portion thereof by way of the balls.

That inclusion of jacks greatly increases the danger of mistakes in operating and handling the machine, which can have very damaging consequences.

SUMMARY OF THE INVENTION

The invention makes it possible reliably to prevent any mistakes in operation on the part of the driver.

In accordance with the invention, there is provided an apparatus which is intended to prevent the rotary portion from being driven in rotation as long as the jack has moved the members of revolution away from the track. When the rotary machine is mounted on a motor vehicle, it is also recommended that a second apparatus be provided, which is intended to prevent the vehicle from being set in movement until the jack has moved the members of revolution away from their track.

By virtue of that array of protective devices, the invention provides a machine having a high level of reliability and enjoying a long service life.

BRIEF DESCRIPTION OF THE DRAWING

The single FIGURE of the accompanying drawing illustrates the invention.

The single FIGURE is a diagrammatic view of a centrifuge mounted on a lorry.

DETAILED DESCRIPTION OF THE PREFERRED EMBODIMENTS

The centrifuge comprises a vertical shaft 1 about which a rotary portion 2 rotates. The rotary portion 2 is carried by a fixed portion 3, by way of a ball bearing assembly 4. The balls 4 rest on the fixed portion 3 and roll on a track member 5 which is fixed or mounted to the rotary portion 2.

Lifting jacks 6 raise the rotary portion 2. The pneumatic jacks 6 are fed from a tank 7 through a pump 8 by means of a main circuit 9. A branch circuit 10 with a valve 11 controlled by a hand lever 12 short-circuits the pump 8.

Mounted on the main circuit 9 are two pressure controllers 13 and 14. The pressure controller 13 detects the pressure in the main circuit 9 and, as long as the pressure exceeds an upper pressure threshold value, supplies an electrical circuit 15 with an electrical signal for disconnecting the motor 16 which drives the shaft 1 from voltage. The pressure controller 14 also detects the same pressure and, as long as the pressure is not lower than a lower threshold pressure, supplies an electrical circuit 16a with a signal which cuts off the ignition circuit 17 (not shown) of the lorry. The lorry cannot start as long as the pressure in the circuit 9 is not sufficiently low, that is to say, as long as the jacks 6 have not been lowered.

The pump 8 is switched on by means of an electrical circuit 18 having a manual switch 19. The switch 19 may also be operated automatically by a switch relay 20 mounted on an output circuit 21 of the pressure controller 14. As soon as the pressure in the circuit 9 is lower than a given threshold, the pressure controller 14 closes the circuit 18 by way of the circuit 21 and the relay 20. The pump 8 comes into operation and re-establishes the pressure. The centrifuge operates in the following manner: assuming the lorry which carries it already is stopped, the jacks 6 are in the lowered position as the valve 11 is open and the pump 8 is not operating. The centrifuge operates in the normal way.

When the centrifuge is to be moved, the circuit 18 is closed by means of the switch 19 and the valve 11 is closed by means of the hand lever 12. The pump 8 comes into operation and passes fluid into the circuit 9. The jacks 6 raise the rotary portion 2 from the fixed portion 3. The balls 4 are no longer in contact with the track member 5. As soon as the pressure in the circuit 9 has exceeded a first given lower threshold, the pressure controller 13 prevents any operation of the motor 16, by means of the circuit 15.

As soon as the pressure in the circuit 9 exceeds a second given upper threshold, the pressure controller 14 permits the lorry to start up, by means of the circuit 16a. As soon as the pressure in the circuit 9 exceeds a third given threshold which is higher than the second threshold, the pressure controller 14 opens the switch 19 by way of the relay 20. The pump 8 is switched off. The lorry is set in movement. Thus, the centrifuge is moved from one place to another while the balls 4 are not in contact with the track member 5 and there is no danger of causing damage to the rolling bearing, and while the motor 6 cannot operate. If the pressure in the circuit 9 temporarily falls again to a value below the third given upper threshold, the pressure controller 14 closes the switch 19 again to re-establish the pressure required for operation of the jacks 6.

The vehicle arrives at the fresh location at which the centrifuge is to operate, and the lorry is stopped. The hand lever 12 is actuated to open the valve 11. The pump 8 is short-circuited. The pressure in the circuit 9 falls. The jacks 6 move downwardly. The track member 5 comes into contact with the balls 4. The pressure controller 13 supplies an electrical signal to the motor 16, enabling operation of the latter. The motor 16 is switched on. The centrifuge comes into operation.

What is claimed is:

1. A rotary machine comprising, mounted on a motor vehicle:
   a fixed portion;

a rotary portion;

a rolling bearing for supporting said rotary portion on said fixed portion, said rolling bearing having revolving members mounted on one of said portions and a track on the other of said portions on which said revolving members roll;

jack means for separating the revolving members and the track;

drive means for driving said rotary portion;

inhibiting means coupled between said jack means and said drive means for preventing rotation of said rotary portion while the revolving members and the track are separated; and motion prevention means for preventing the vehicle from being set in motion unless the jack means has separated the revolving members and the track.

2. A machine as claimed in claim 1 wherein said jack means has a feed circuit, said drive means has a motor and said inhibiting means comprises a pressure sensor responsive to the pressure in the feed circuit of the jack means, and an electrical circuit connecting the pressure sensor to the motor of said drive means, said electrical circuit passing an inhibiting signal to the motor when the sensor detects a pressure exceeding a first threshold value.

3. A machine as claimed in claim 2 in which said vehicle has an ignition system and said prevention means comprises a second pressure sensor responsive to the pressure in the feed circuit of said jack means and an electrical circuit connecting said second pressure circuit to the ignition circuit of the vehicle, said electrical circuit preventing ignition as long as the second pressure sensor detects a pressure below a second threshold value.

4. A machine as claimed in claim 3 further comprising third means responsive to pressure in the feed circuit of the jack means, said third means re-establishing pressure in the feed circuit when the pressure falls below a third threshold value higher than said second threshold value.

5. A machine as claimed in claim 4 wherein said third means comprises the second pressure sensor, a pump feeding said feed circuit of said jack means, an electrical circuit controlling said pump and a switch in said electrical circuit controlled by said second pressure sensor.

* * * * *